United States Patent [19]

Tachi et al.

[11] Patent Number: 5,608,473

[45] Date of Patent: Mar. 4, 1997

[54] AUDIO DATA READOUT DEVICE FOR MOTION PICTURE FILM AND CLOCK GENERATING DEVICE IN MOTION PICTURE FILM CHANGEOVER SYSTEM

[75] Inventors: Katsuichi Tachi; Kozo Kaminaga, both of Kanagawa, Japan; Jeffrey E. Taylor, Chatsworth; Howard J. Flemming, Culver City, both of Calif.

[73] Assignees: Sony Corporation, Tokyo, Japan; Sony Cinema Products Corporation, Culver City, Calif.

[21] Appl. No.: 399,436

[22] Filed: Mar. 7, 1995

[30] Foreign Application Priority Data

Mar. 7, 1994 [JP] Japan .................................. 6-036060

[51] Int. Cl.⁶ ............................ G03B 31/02; G03B 31/00
[52] U.S. Cl. .................................................. 352/27; 352/7
[58] Field of Search .............................. 352/27, 7, 8, 9

[56] References Cited

U.S. PATENT DOCUMENTS

1,775,019  9/1930  Cook ............................................. 352/7
1,893,576  1/1933  Brocius ......................................... 352/7
4,218,115  8/1980  Parker .......................................... 352/7
5,327,182  7/1994  Kohut et al. ................................ 352/27

Primary Examiner—Safet Metjahic
Assistant Examiner—John Chizmar
Attorney, Agent, or Firm—William S. Frommer; Alvin Sinderbrand

[57] ABSTRACT

An audio data readout device for a motion picture film and a clock generating device in a changeover system for a motion picture film. First and second clock generating circuits generate first and second clocks of predetermined frequencies based upon a repetition frequency of perforations detected by first and second film readers and a repetition frequency of a track pitch of audio data, and route the resulting clocks to a changeover switch. At a changeover time, a changeover controller switchingly controls the changeover switch to select the second clock. A system clock generating circuit has loop characteristics of a longer time constant than the first or second clock generating circuits and smoothly locks the second clock to generate a system clock which is outputted. A stable and accurate system clock can be generated and outputted even when film running is unstable at the changeover time.

10 Claims, 9 Drawing Sheets

FIG.9 ns in the audio data reproducing device. More particularly, it relates to such audio data reproducing device and the clock generating device in the changeover system for a motion picture film in which the former half and the latter half of the motion picture are respectively recorded in a first roll and a second roll and reproduction is performed through the first and second rolls continuously with changeover between the first and the second rolls.

AUDIO DATA READOUT DEVICE FOR MOTION PICTURE FILM AND CLOCK GENERATING DEVICE IN MOTION PICTURE FILM CHANGEOVER SYSTEM

BACKGROUND OF THE INVENTION

This invention relates to an audio data reproducing device for a motion picture film and a clock generating device in a changeover system for a motion picture film conveniently provided in the audio data reproducing device. More particularly, it relates to such audio data reproducing device and the clock generating device in the changeover system for a motion picture film in which the former half and the latter half of the motion picture are respectively recorded in a first roll and a second roll and reproduction is performed through the first and second rolls continuously with changeover between the first and the second rolls.

With a conventional motion picture film, picture recording regions are arrayed in the form of frames at a mid portion of the film, and perforations for taking up the film are provided in rows on both sides of the picture recording regions. An analog sound track is provided in a straight line between the picture recording regions and one of the rows of the perforations extending along the film takeup direction. It is on this analog sound track that audio signals are recorded in an analog form.

Recently, with the progress in digital techniques, attempts are being made for digitally recording the audio information. Since the recording positions for the picture recording regions and the analog sound tracks are standardized by the Society of Motion Picture and Television Engineers (SMPT), the digitized audio information (audio data) are recorded in positions other than the recording positions for the picture recording regions or the analog sound track.

Specifically, audio data for the right channel and audio data for the left channel are formed as the audio data which are recorded in straight lines in each digital sound track provided along the proceeding direction of the motion picture film between the rows of the perforations and the film edges.

The audio data recorded in the digital sound tracks are made up of synchronization data, audio data and tracking patterns recorded in a direction normal to the film proceeding direction. The synchronization data is recorded at the leading end of a block made up of a pre-set number of data units, and the audio data is recorded next to the synchronization data on the block basis. The track pattern is recorded at the recording start portion and at the recording end portion. On the whole, the tracking patterns are recorded in bands along the film proceeding direction on both sides of the digital sound tracks.

The reproducing apparatus for the motion picture film for reproducing the audio data from such motion picture film reads out the audio data etc. of each channel by two CCD line sensors provided for scanning the digital sound tracks of the motion picture film. Each CCD line sensor has a one-line read-out area provided for extending in a direction at right angles to the film proceeding direction. During reproduction, the light radiated from a continually lighted halogen lamp is radiated as a playback light on each readout area via the digital sound tracks of the motion picture film. On the readout region of the CCD line sensor, the synchronization data, audio data or the tracking pattern recorded on the digital sound tracks are illuminated as corresponding lighted data or pattern.

The CCD line sensor receives the lighted synchronization data, audio data and the tracking pattern and, responsive to the readout pulse, converts them into electrical signals which are transmitted to a data processor. The data processor reproduces the audio data block-by-block, in synchronism with the synchronization data, and transmits the reproduced data to a D/A converter. The D/A converter converts the audio data into analog signals which are routed to a speaker unit. Thus an audio output corresponding to the audio data is produced via the speaker unit.

The data processor detects the tracking pattern from the CCD line sensor by way of performing tracking control. The tracking pattern is recorded at the recording start position and the recording end position for one-line audio data. The data processor detects the level difference, for example, of the tracking pattern reproduced at the recording start position and the tracking pattern reproduced at the recording end position for detecting the tracking error and variably controls the readout timing by the CCD line sensor in accordance with the detected tracking error.

Thus it is possible with the data processor to correct the tracking error in order to reproduce audio data at all times under a just-track condition.

Next, if a given motion picture is separately recorded on two rolls, that is a first roll and a second roll, and the reproducing operation is to be shifted from the first roll to the second roll by way of a so-called changeover operation, it is necessary to carry out the operation smoothly lest there should occur interruption of the picture or sound.

The conventional reproducing apparatus for a motion picture film has two reproducing systems, namely a first reproducing system and a second reproducing system, and the first and second reproducing systems are respectively set on the first and second rolls. When the first roll reproduced by the first reproducing systems approaches its end, the second roll starts to be reproduced by the second reproducing.

It is noted that the film perforations are repeatedly formed at a frequency of, for example, 96 Hz. Each reproducing system detects the perforations for forming a detection output having the frequency of 96 Hz. The detection output is stabilized by phase locking with a phase locked loop (PLL) and the system clocks of a pre-set frequency are formed based upon the detection output. These system clocks are utilized in reproducing the audio data.

In the playback start portion of the second roll, there is recorded the same information as the audio data and the picture information recorded for a pre-set time duration in the terminal portion of the first roll. When the playback end of the first roll is approached, the second reproducing system starts its reproducing operation. Thus the first and second reproducing systems are run in parallel and the picture information and audio data reproduced by the first reproducing system are changed over at a measured timing with respect to the picture information and audio data reproduced by the second reproducing system. This achieves the changeover operation, that is the picture information and audio data reproduced by the first reproducing system are changed over to the picture information and audio data reproduced by the second reproducing system.

It is noted that each reproducing system runs the motion picture film under a moderate tension for reproduction. This tension, however, becomes labile at the start and towards the close of roll winding. Consequently, such tension becomes extremely labile during the changeover operation carried out at the start and towards the close of roll winding.

Since each reproducing system forms system clocks based upon the detection output of the film perforations, if the tension becomes extremely labile, the output of detection of the perforations cannot be phase-locked by the PLL circuit. On the other hand, since the audio data is reproduced with the labile system clocks produced under such conditions, correct audio data cannot be reproduced.

Thus the conventional motion picture film reproducing device has a drawback that ideal changeover is obstructed.

SUMMARY OF THE INVENTION

In view of the foregoing, it is an object of the present invention to provide a clock generating device in a changeover system for a motion picture film whereby correct system clocks may be formed during the changeover operation for realizing an ideal changeover operation.

According to the present invention, there is provided a clock generating device in a changeover system for a motion picture film in which audio data is reproduced by changeover between a first film reader for reading out audio data from a digital sound track of a first motion picture film and a second film reader for reading out audio data from a digital sound track of a second motion picture film. The clock generating device includes first clock forming means of a phase locked loop configuration for forming first clocks of a frequency equal to a pre-set number times the frame frequency based upon a frequency signal whose frequency is changed in proportion to a film running speed of the first motion picture film, the audio data of which is read by the first film reader, and second clock forming means of a phase locked loop configuration for forming second clocks of a frequency equal to a pre-set number times the frame frequency based upon a frequency signal whose frequency is changed in proportion to a film running speed of the second motion picture film, the audio data of which is read by the second film reader. The clock generating device also includes changeover means for commuting between the first clocks from the first clock forming means and the second clocks from the second clock forming means and outputting the selected clock. System clock forming means of a phase locked loop configuration forms system clocks of a frequency equal to a pre-set number times the sampling clock frequency of the audio data recorded on the digital sound track based upon the first or second clocks from the changeover means. The system clock forming means has looping characteristics of a pre-set time constant longer than that of the first and second clock forming means.

According to the present invention, there is also provided an audio data readout device for a motion picture film including a first film reader for reading out audio data from a digital sound track of a first motion picture film and a second film reader for reading out audio data from a digital sound track of a second motion picture film. The audio data readout device also includes first clock forming means of a phase locked loop configuration for forming first clocks of a frequency equal to a pre-set number times the frame frequency based upon a frequency signal whose frequency is changed in proportion to a film running speed of the first motion picture film, the audio data of which is read by the first film reader, and second clock forming means of a phase locked loop configuration for forming second clocks of a frequency equal to a pre-set number times the frame frequency based upon a frequency signal whose frequency is changed in proportion to a film running speed of the second motion picture film, the audio data of which is read by said second film reader. The audio data readout device also includes changeover means for commuting between audio data read out by the first film reader and audio data read out by the second film reader and also for commuting between the first clocks from the first clock forming means and the second clocks from the second clock forming means and outputting the selected clocks. System clock forming means of a phase locked loop configuration forms system clocks of a frequency equal to a pre-set number times the sampling clock frequency of the audio data recorded on the digital sound track based upon the first or second clocks from the changeover means. The system clock forming means has looping characteristics of a pre-set time constant longer than that of the first and second clock forming means.

DETAILED DESCRIPTION OF THE INVENTION

Referring to the drawings, preferred embodiments of the clock generator in the changeover system for the motion picture film according to the present invention will be explained in detail.

The present embodiment of the clock generator in the changeover system for the motion picture film forms correct system clocks at the time of the changeover when a single motion picture is recorded on plural film rolls and reproduced by transition in reproduction from the first roll to the second roll.

Figure 1:
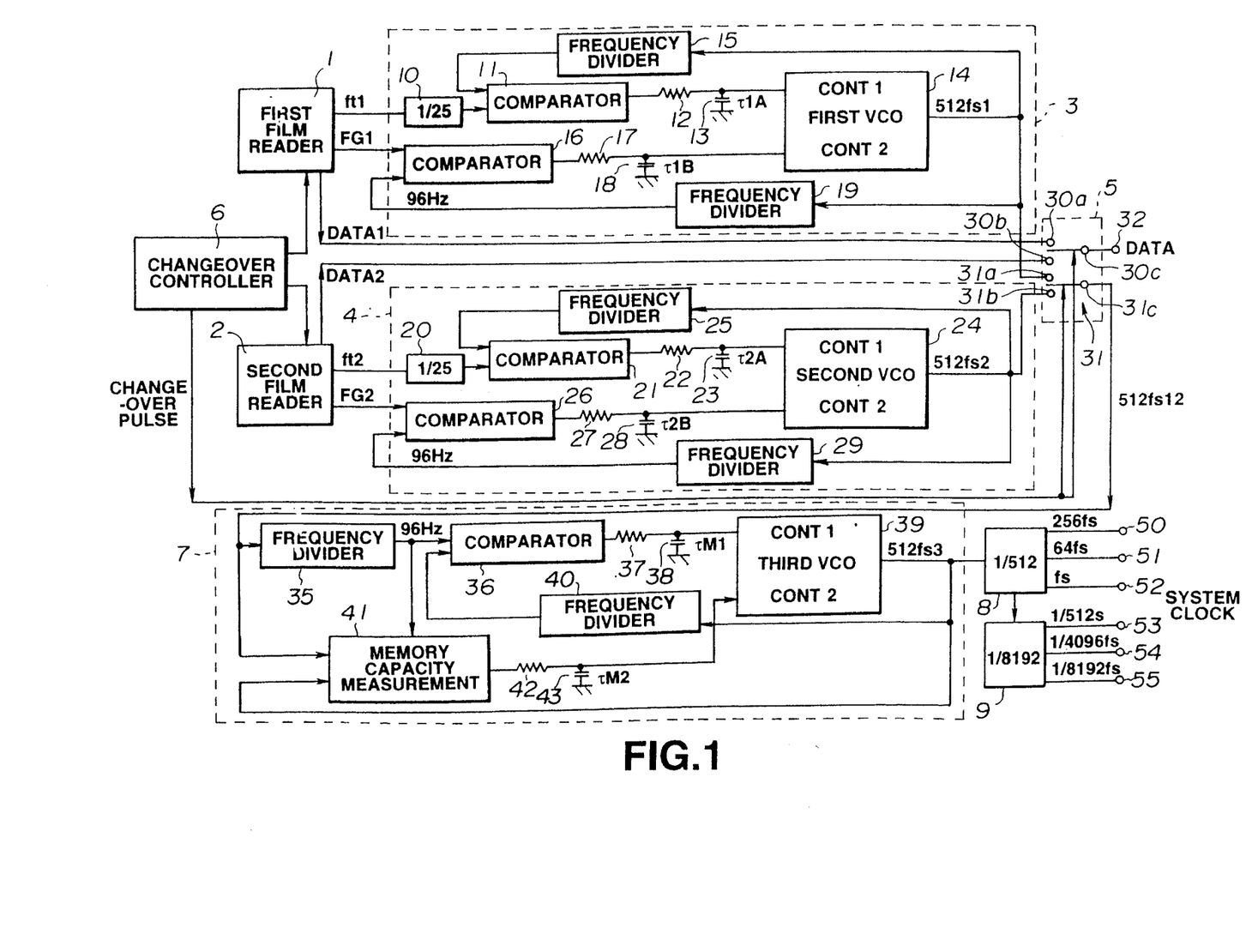
FIG. 1 is a block diagram showing a clock generating device in the changeover system for the motion picture film according to an embodiment of the present invention.

The clock generator has first and second film readers 1 and 2, a first clock generating circuit 3 for generating clocks of a pre-set frequency based upon a pre-set detection output from the first film reader 1, and a second clock generating circuit 4 for generating clocks of a pre-set frequency based upon a preset detection output form the second film reader 1, as shown in FIG. 1.

The clock generator also has a changeover switch 5 for changing over the clocks from the first and second clock generating circuits 3, 4 and outputting the selected clocks, a changeover controller 6 for controlling the changeover of the changeover switch 5 during the changeover, and a system clock forming circuit 7 for forming system clocks of a pre-set frequency based upon the clocks from the changeover switch 5.

The clock generator also has a divide-by-512 frequency divider 8 for dividing the frequency of the system clocks by 512 for generating system clocks for the reproducing system for audio data and a divide-by-8192 frequency divider 9 for dividing the frequency of the system clocks divided in frequency by the divide-by-512 frequency divider for generating system clocks for the above audio data error correction system.

The first clock generating circuit 3 has the configuration of a so-called phase locked loop in which oscillation of a first voltage-controlled oscillator (VCO) 14 is controlled depending upon the error between first clocks 512fs1 produced by the first VCO 14 and the repetition frequency FG1 having the repetition frequency of the perforations as detected by the first film reader 1 as well as the error and that between the first clocks 512fs1 and the track frequency ft1 having the repetition frequency corresponding to the track pitch of the audio data.

Similarly, the second clock generating circuit 4 has the configuration of a so-called phase locked loop in which the phase of oscillation of a second voltage-controlled oscillator (VCO) 24 is controlled depending upon the error between second clocks 512fs2 produced by the second VCO 24 and the frame frequency FG2 having the frequency of the perforations as detected by the second film reader 2 as well as the error between the second clocks 512fs2 and the track frequency ft2 corresponding to the track pitch of the audio data.

The changeover switch 5 is made up of a first changeover switch 30 for changing over the audio data read out by the film readers 1, 2 by a changeover pulse from the changeover controller 6 and a second changeover switch 31 for changing over the first or second VCO clocks from the first or second lock generating circuits 3, 4 by the changeover pulse from the changeover controller 6 and outputting the selected VCO clock.

The system clock generating circuit 7 has a PLL circuit configuration in which a clock having the frequency of 96 Hz equal to the repetition frequency of the perforations, which represent a clock of the frame frequency acting as a reference when generating system clocks from the clocks supplied via the second changeover switch 31, and in which the oscillation phase of a third VCO 39 is controlled responsive to an error between this 96 Hz clock the clock obtained by frequency dividing the system clock outputted by the third VCO 39. The oscillation phase of VCO 39 is further controlled by the results of calculation by a memory capacity measurement circuit 41 based upon the above 96 Hz clock and the system clock outputted by the third VCO 39.

On the motion picture film, there are formed rows of perforations on either sides of the picture recording regions at a pre-set interval along the proceeding direction, and there are formed a digital sound track for the right channel and a digital sound track for the left channel extending in the film proceeding direction between the rows of perforations and the film edges.

On the digital sound track for the left channel, there are sequentially formed a center channel C, a left channel L, a center left channel CL, a surround left channel SL and a sub-woofer channel SW, while a right mix channel RM, formed from a right channel R, a center right channel CR and a surround right channel SR, is also formed as lumped left-route audio data.

On the digital sound track for the right channel, there are sequentially formed a center channel C, a right channel R, a center right channel CR, a surround right channel SR and a sub-woofer channel SW, while a left mix channel LM, formed from a left channel R, a center left channel CL and a surround left channel SL, is also formed as lumped right-route audio data, with each bit as one dot.

Specifically, audio data is compressed to a data volume on the order of one-fifth by high efficient encoding using the combination of sub-band coding, orthogonal transform coding and bit allocation. Error correction codes of C2 parity and C1 parity employing the cross-interleave Reed-Solomon code is appended for each film block as a recording unit, in addition to the leading-end data made up of the synchronization data, tracking patterns or the discrimination information.

At the same position along the film width, right channel data and left channel data are recorded with a physical shift of, for example, 17.8 frames.

Figure 2:
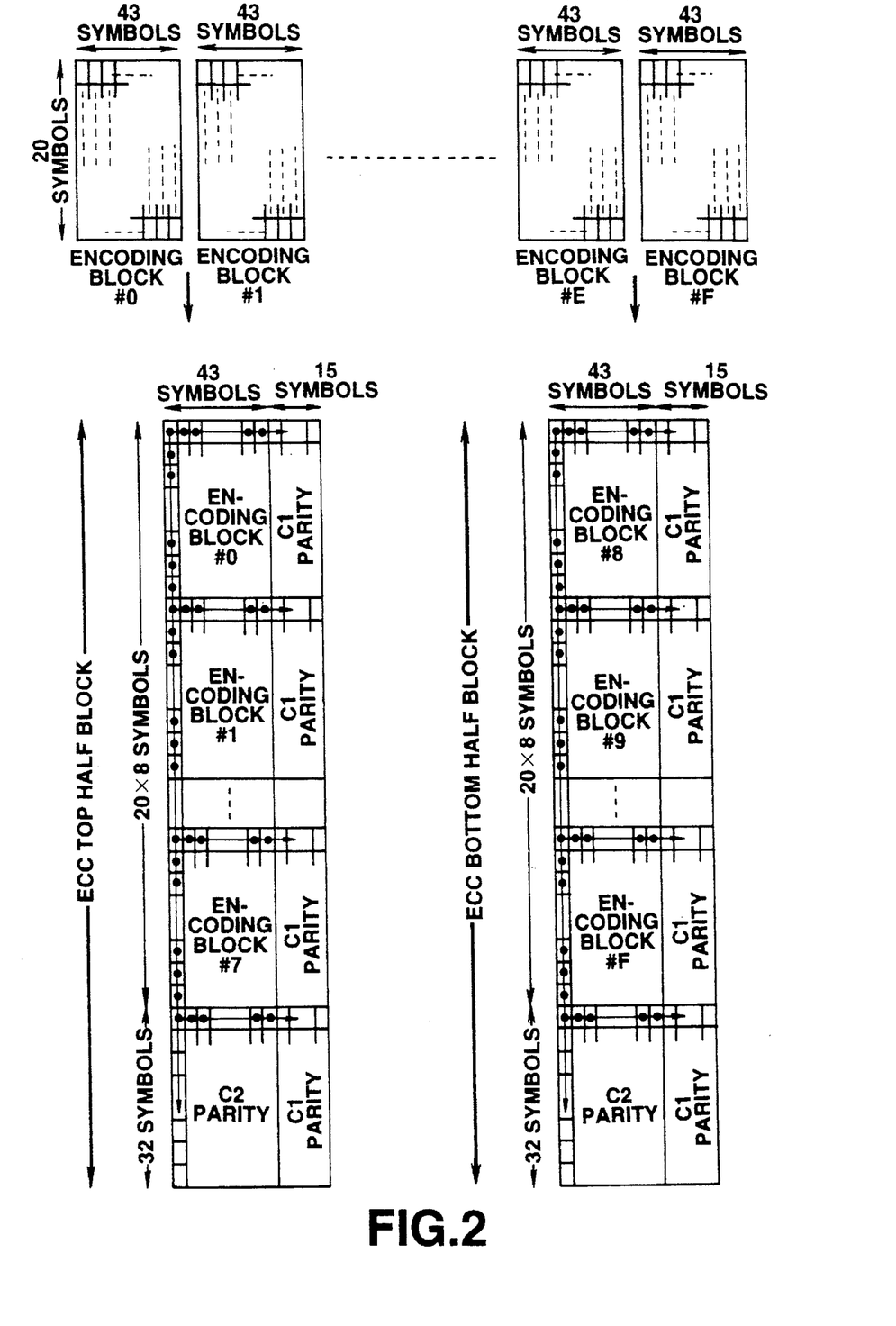
FIG. 2 shows an encoding block for audio data recorded on the motion picture film.

That is, for recording the above audio data, 16 compression blocks, each consisting of 43 transverse symbols (one symbol=1 dot) and 20 vertical symbols, as shown in FIG. 2, are formed. The first eight of these compression blocks are an ECC top half block to which the C2 parity is appended, while a so-called C1 parity is added to each compression block and to the C2 parity. The second eight compression blocks are an ECC bottom half block to which the C2 parity is appended, while a so-called C1 parity is added to each compression block and to the C2 parity.

Figure 3:
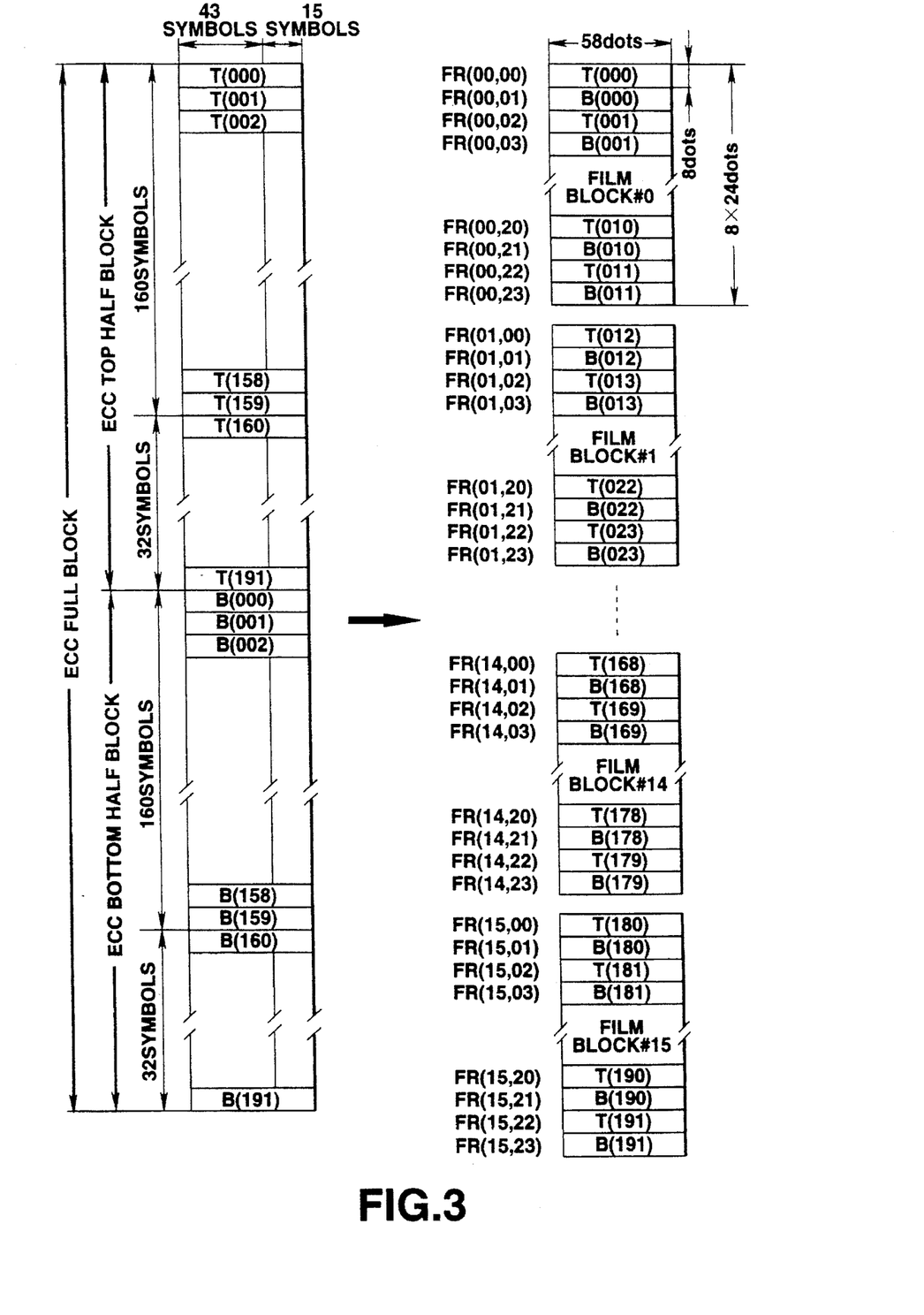
FIG. 3 shows the manner of forming a film block by interleaving the compression blocks.

This forms an ECC full block made up of the ECC top half block consisting of data lines T000 to T191 and the ECC bottom half block consisting of data lines B000 to B191, as shown in FIG. 3.

Then, each one data line is extracted from the ECC top half block and the ECC bottom half block to form a film block consisting of 24 data lines, by way of the interleaving operation. A sum total of 16 such film blocks (film block 0 to film block 15) are formed, as shown in FIG. 3. The digital sound track is formed for each of the film blocks.

Figure 4:
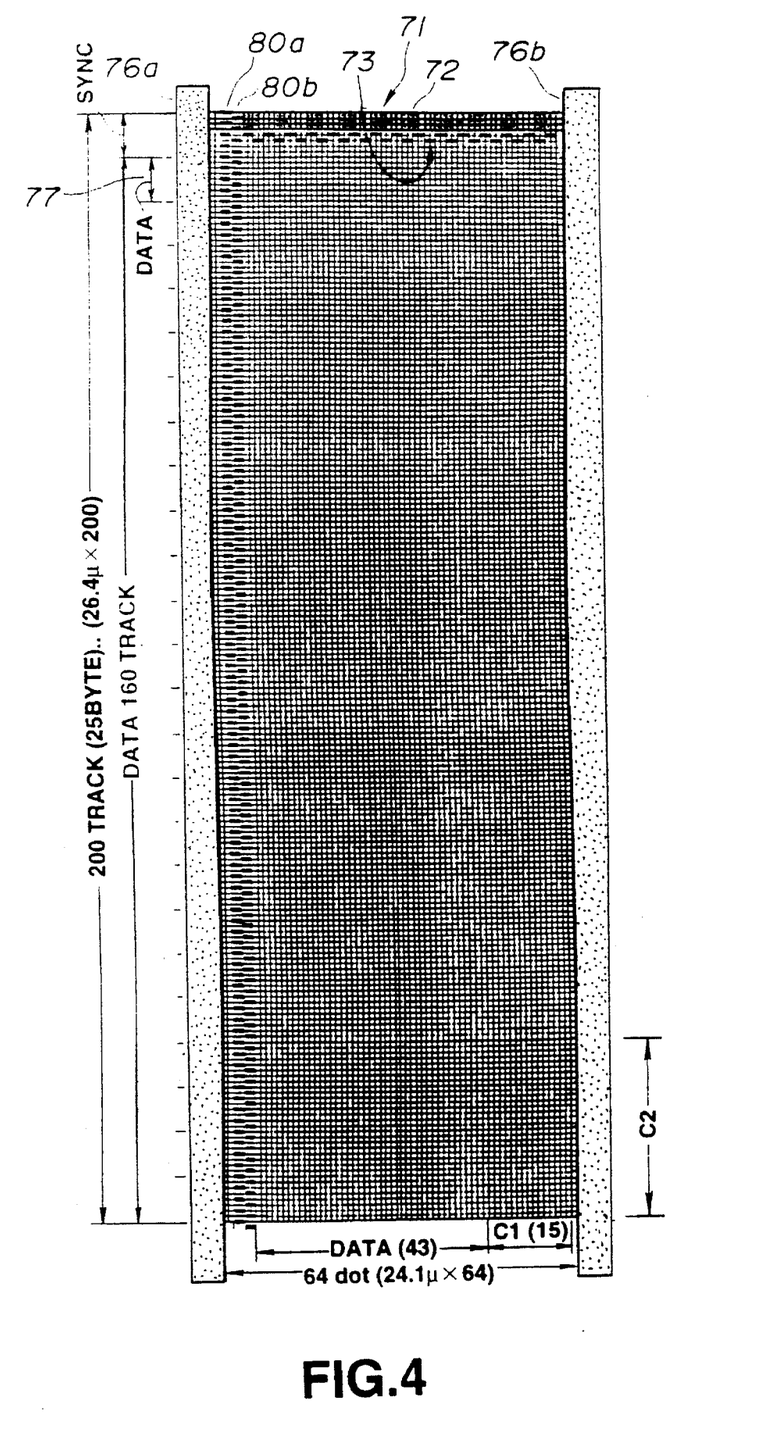
FIG. 4 shows the manner in which a film block is actually recorded on the motion picture film.

Referring to FIG. 4, there are recorded in the film block the leading-end data 71, light-intercepting areas 76a, 76b, formed as black stripes on both sides of the digital sound tracks along the film proceeding direction, and tracking patterns 80a, 80b formed in stripes adjacent to the light intercepting area 76a along the film proceeding direction, with a shift of one dot along the film proceeding direction.

The audio data is recorded next to the leading end data 71 extending at right angles to the film proceeding direction and in a side-by-side relation along the film proceeding direction.

Figure 5:
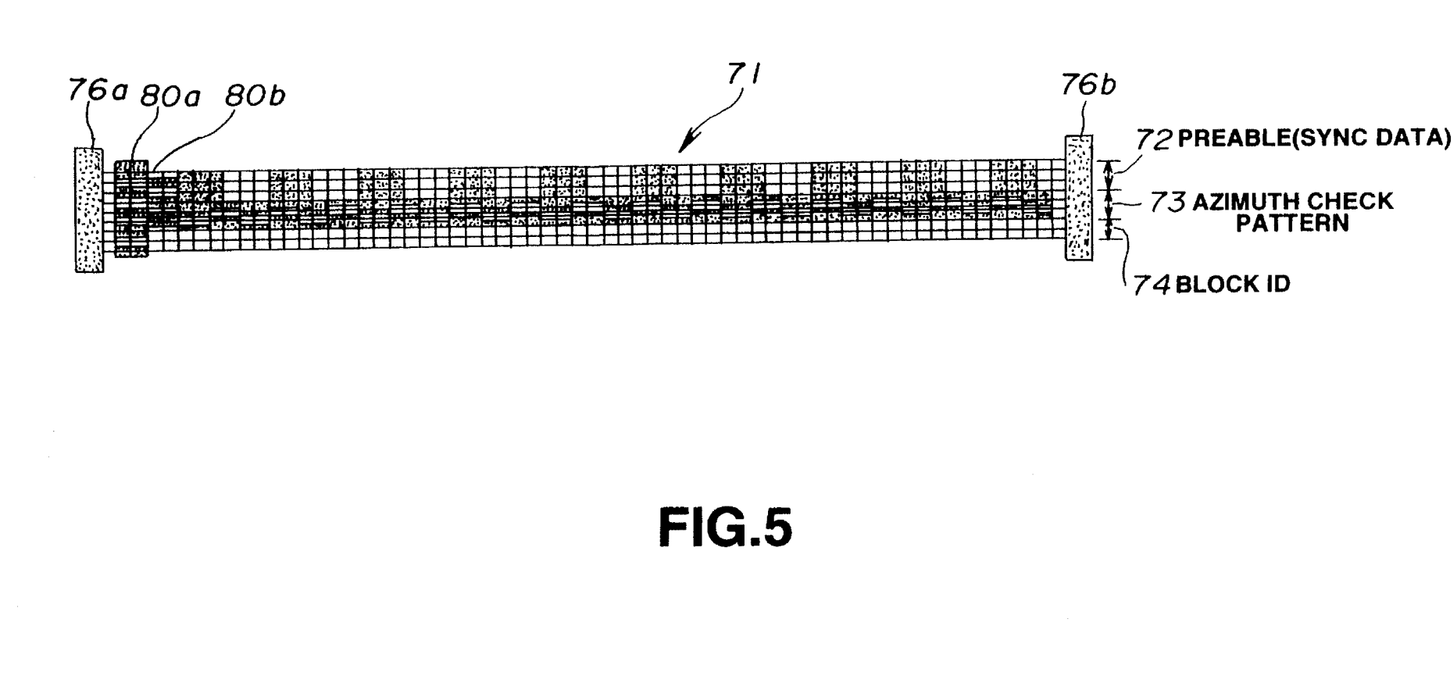
FIG. 5 shows the manner in which the leading-end data is recorded at the leading-end of the film block.

As the leading end data 71, there are recorded preamble 72 as a repetitive pattern of alternate three white and black dots extending in the film proceeding direction and in the direction at right angles to the film proceeding direction, an azimuth check pattern 73 made up of a repetitive pattern of two white and block dots extending in a direction normal to the film proceeding direction and a repetitive pattern of two white and black dots extending in a direction normal to the film proceeding direction with a shift of two dots relative to the repetitive pattern, and a block ID 74, including film block identification numbers, as shown in FIG. 5.

Figure 6:
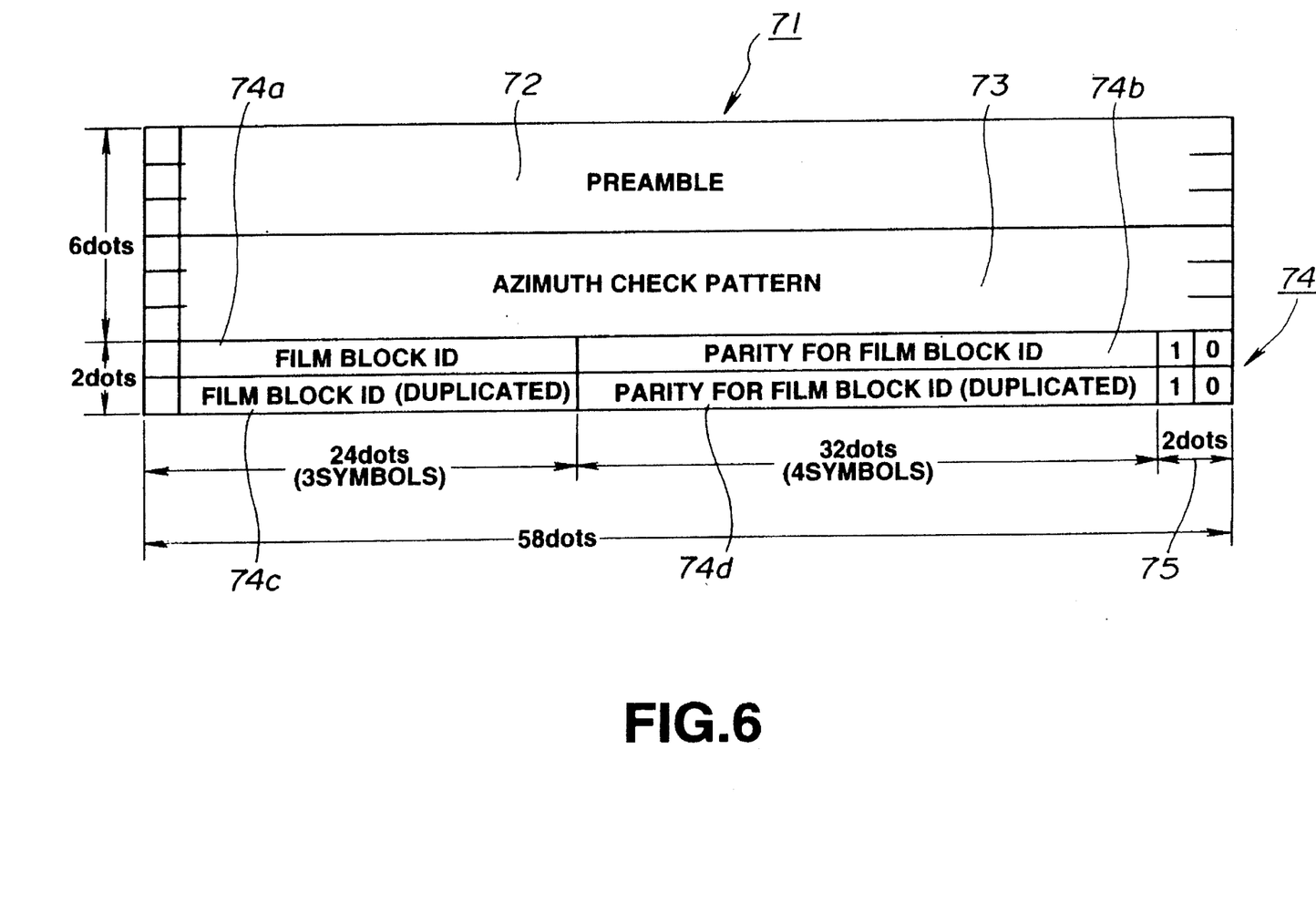
FIG. 6 illustrates the leading-end data recorded at the leading end of the film block.

In the block ID 74 are recorded a film block ID 74a, a parity 74b for the film block ID 74a, a film block ID 74c and a parity 74d for the film block ID 74c, as shown in FIG. 6. The film block ID 74a is recorded as 24 dots extending in a direction at right angles to the film proceeding direction for indicating the block number of the film block, while the film block ID 74b is recorded next to the film block ID 74a as 32 dots. The parity 74c is recorded in a side-by-side relation with the film block ID 74a along the film proceeding direction for indicating the block number of the film block. The parity 74d is recorded as 32 dots next to the film blocks 74c.

That is, the block ID comprises dual recording of the film blocks ID and parity data therefor.

Figure 7:
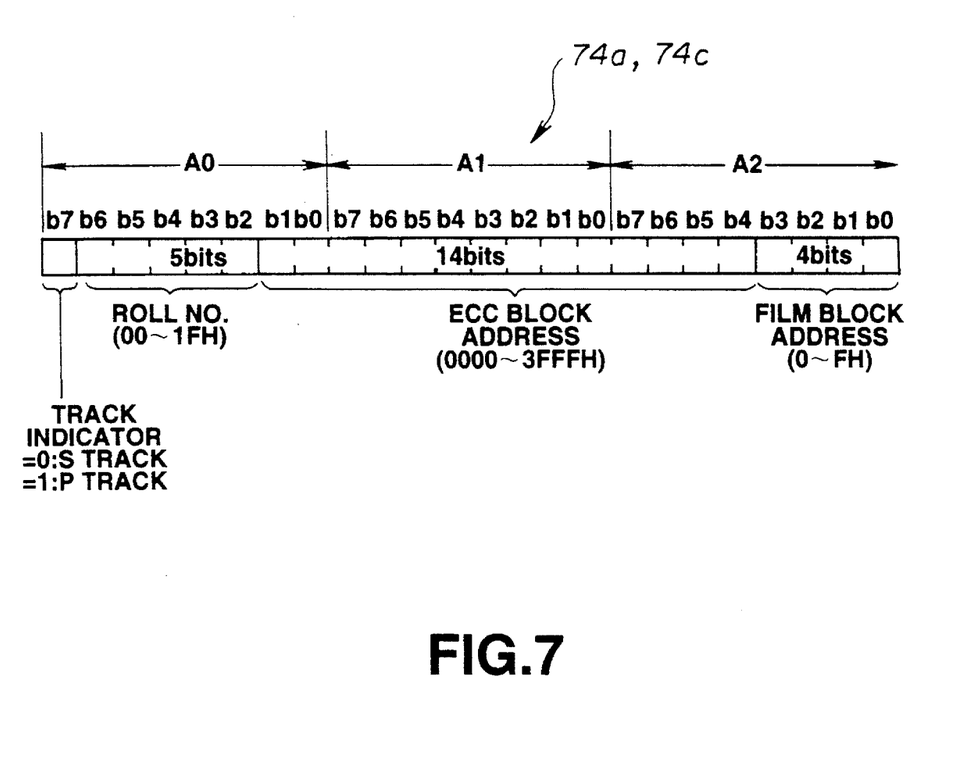
FIG. 7 illustrates the contents of the film block ID of the leading-end data.

In the film block IDs 74a, 74c, there are recorded 1-bit track indicators indicating whether the digital sound track is the right channel digital sound track or the left channel digital sound track, a 5-bit roll number indicating the number of the roll for the motion picture film, a 14-bit compression block address indicating the address for each compression block and a 4-bit film block address indicating the address of the film block, as shown in FIG. 7.

Figure 8:
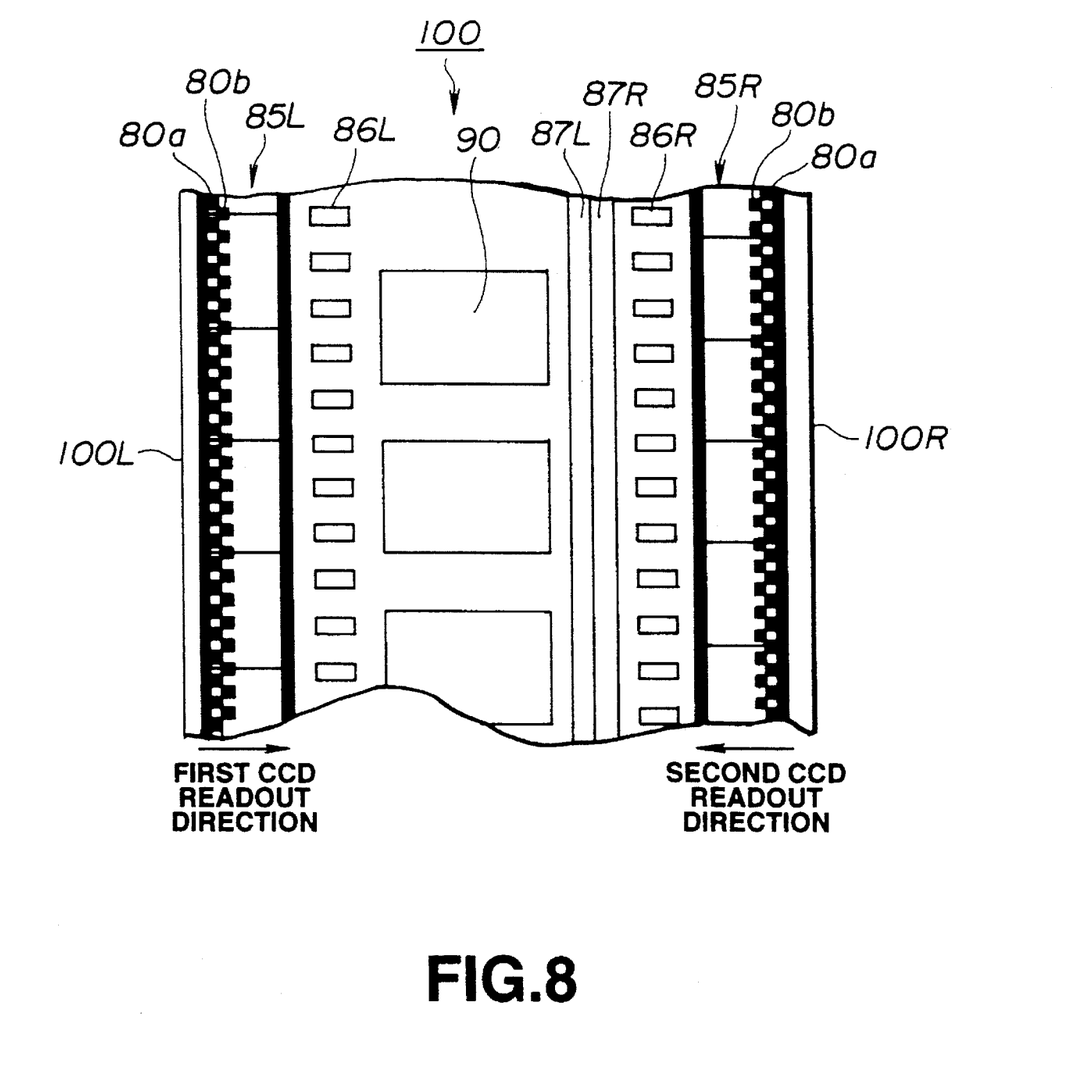
FIG. 8 illustrates the audio data recorded in each digital sound track of the motion picture film.

On the motion picture film 100, there are symmetrically the film blocks on a right channel digital sound track 85R and on a left channel digital sound track 85L, as shown in FIG. 8.

That is, the film blocks are recorded on the left channel digital sound track 85L so that the tracking patterns 80a, 80b are on the side adjacent a left edge 100L of the motion picture film 100, while the film blocks are also recorded on the right channel digital sound track 85R so that the tracking patterns 80a, 80b are on the side adjacent a right edge 100R of the motion picture film 100, as shown in FIG. 8.

As will be explained subsequently, the left channel digital sound track 85L and the right channel digital sound track 85R are read out by the CCD line sensors during reproduction from the left edge 100L and the right edge 100R of the motion picture film 100, respectively.

The operation of the clock generator in the above-described changeover system for the motion picture film is as follows:

If a motion picture film is recorded separately on first and second film rolls, the first film roll having the former half of the motion picture is set on the first film reader, while the second film roll having the latter half of the motion picture is set on the second film reader. The first film reader only is actuated by the changeover controller 6 for reproducing the motion picture film.

In FIG. 8, the motion picture film 100 is run at a velocity of reproducing 24 picture frames per second. Four perforations, 86L, 86R, for example, are provided for each frame of the film recording regions 90.

By detecting the perforations 86L, 86R during reproduction of the motion picture film 100, the first film reader 1 detects and outputs a frame signal FG1 having the repetition frequency of 24 (frames/second)×4=96 Hz.

On the digital sound tracks 85R, 85L for the right and left channels of the motion picture film 100 are recorded audio data per each byte in a direction at right angles to the proceeding direction of the motion picture film 100. The track pitch of the audio data represents the repetition frequency of, for example, 44100/512×200=17.2 kHz, wherein 44100 is the conventional sampling frequency (44.1 kHz) used to digitize audio data.

The first film reader 1 detects and outputs the track frequency signal ft1 having the repetition frequency of 17.2 kHz of the track pitch of the audio data, along with the frame signal FG1 obtained on detection of the perforations.

The track frequency signal ft1 is detected from at least one of the right channel digital sound track 85R and the left channel digital sound track 85L of the motion picture film.

The frame signal FG1 is fed to a non-inverting input terminal of the comparator 16, while the track signal frequency ft1 is fed to the divide-by-25 frequency divider.

The divide-by-25 frequency divider 10 divides the track frequency signal ft1 of 17.2 kHz by 25 and transmits the resulting data to a non-inverting terminal of the comparator 11.

The first clocks 512fs1, outputted by the first VCO 14 as later explained, is frequency-divided by the frequency divider 15 and fed back to the inverting input terminal of the phase comparator 11. The comparator 11 phase-compares the track frequency signal ft1, frequency-divided by the divide-by-25 frequency divider 10, to the first clocks 512fs1, frequency-divided by the frequency divider 15, and routes the difference to the first VCO 14 via an integration circuit made up of a resistor 12 and a capacitor 13.

The first clock 512fs1 from the first VCO 14 is fed back to the inverting input terminal of the phase comparator 18 after frequency division by the frequency divider 19. The comparator 16 phase-compares the frame frequency signal FG1 to the first clocks 512fs1, frequency-divided by the frequency divider 19, and routes the difference to the first VCO 14 via an integration circuit made up of a resistor 17 and a capacitor 18. The loop made up of the phase comparator 16, resistor 17, capacitor 18, first VCO 14 and the frequency divider 19 has loop characteristics having a e.g., 1-sec time constant τ1 B.

The first VCO 14 is responsive to the comparison output from the comparator 11 and that from the comparator 16 to form first clocks 512fs1 of the frequency 512×44.1 kHz which are fed to a fixed terminal 31a of second changeover switch 31 within the switch 5.

When the first film reader 1 is in operation, the second changeover switch 31 is controlled by the changeover controller 6 for selecting the fixed terminal 31a by a movable contact 31c. Thus the first clocks 512fs1 are fed via the second changeover switch 31 to a frequency divider 35 and the memory capacity measurement circuit 41 of the system clock generating circuit 7.

The frequency divider 35 again forms 96 Hz clocks from the first clocks 512fs1 and routes the 96 Hz clocks to the memory capacity measurement circuit 41 and to the non-inverting input terminal of the comparator 36.

The inverting terminal of the comparator 36 is fed via a frequency divider 40 with the system clock 512fs3 from the third VCO 39 as later explained. The comparator 39 phase-compares the clock from the frequency divider 35 to the system clock obtained by frequency division by the frequency divider 40 and routes a comparison output indicating the difference to the third VCO 39 via an integrator circuit made up of a resistor 37 and a capacitor 39. The loop made up of the phase comparator 36, resistor 37, capacitor 39, third VCO 39 and the frequency divider 40 has loop characteristics having e.g., a 2000-sec time constant τM1.

The memory capacity measurement circuit 41 is an up/down counter for counting the first clock from VCO 39 as up-pulses and the clock from the frequency divider 35 as reset pulses. The difference between the first clock or second clock and the system clock represents the capacity of the buffer memory for time axis correction of audio data. Thus the memory capacity measurement circuit 41 generates control clocks so that the difference is less than a pre-set capacity, and routes the control clocks to the third VCO 39 via an integration circuit made up of a resistor 42 and a capacitor 43. The loop made up of the memory capacity measurement circuit 41, resistor 42, capacitor 43 and the third VCO 39 has loop characteristics having e.g., a 8-sec time constant τM2.

The third VCO 39 is responsive to control clocks from the memory capacity measurement circuit 41 and clocks from the comparator 36 to generate system clock 512fs3 having a frequency equal to an integer number times the frequency of the sampling clock for the audio data and routes the system clock 512fs3 to the divide-by-512 frequency divider 8.

The divide-by-512 frequency divider 8 divides the system clock 512fs3 by 512 and transmits the resulting clock to the divide-by-8192 frequency divider 9. The frequency divider 8 likewise forms three kinds of clocks 256 fs, 64 fs and fs, where fs is e.g. 44.1 kHz, and outputs these different clocks.

The divide-by-8192 frequency divider 9 further divides the clock produced by the divide-by-512 frequency divider 8 to form 1/512 fs clocks for decoding audio data, 1/4096 fs clocks for ½ error correction and 1/8192 clocks for error correction and outputs these clocks via output terminals 53 to 55.

Figure 9:
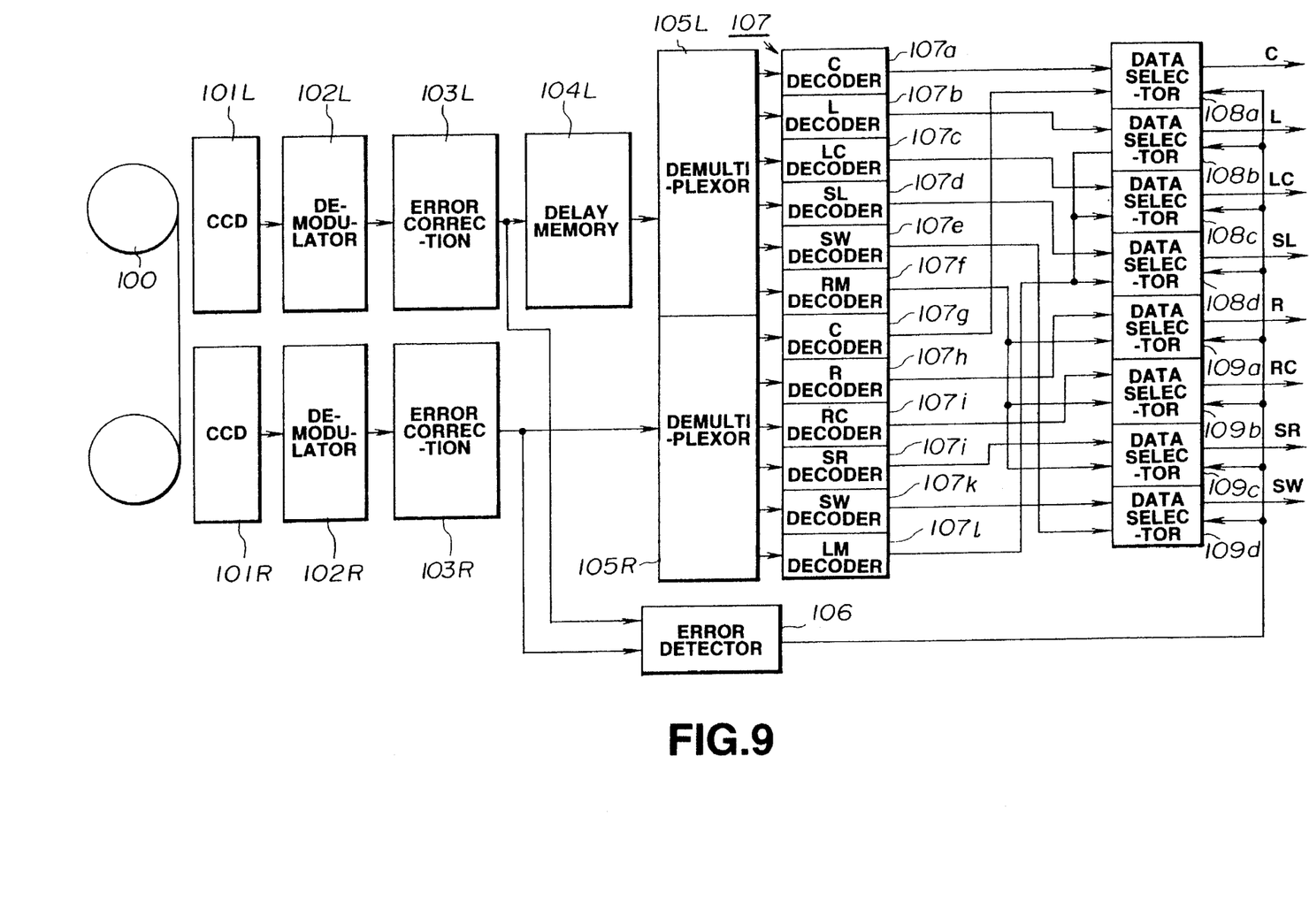
FIG. 9 is a block diagram showing a reproducing system including the changeover system for the motion picture film.

The film reader 1 has an audio data reproducing system, as shown in FIG. 9, and reads out the audio data recorded on the motion picture film 100. At this time, the left channel audio data and the right channel audio data are read from the left edge 100L and the right edge 100R of the motion picture film 100 by the left channel CCD line sensor 101L and the right channel CCD line sensor 101R, respectively.

The tracking patterns 80a, 80b and the audio data etc., recorded on the digital sound tracks 85L, 85R, are recorded symmetrically in the left-right direction, as shown in FIG. 8. By reading out data from the film edges 100L, 100r by the CCD line sensors 101L, 101R in this manner, the tracking patterns 80a, 80b and the audio data can be correctly read out without being obstructed by the perforations 86L, 86R. The result is that the audio data can be correctly reproduced by correct tracking controlled by the tracking patterns 80a, 80b.

The audio data reproduced by the CCD line sensors 101L, 101R are fed to a fixed terminal 30a of the first changeover circuit 30 within the changeover switch 5 shown in FIG. 1.

The first changeover switch 30 is controlled by the changeover controller 8 for selecting the fixed terminal 30a when the first film reader 1 is in operation. Consequently, the audio data read out by the first film reader 1 are fed from the first changeover switch 30 via output terminal 32 to the demodulators 102L, 102R shown in FIG. 9.

The demodulators 102L, 102R demodulate the audio data and route the demodulated data to error correction circuits 103L 103R, respectively.

The error correction circuit 103L performs error correction on the left-route audio data from the demodulator 102L, based upon clocks of 1/8192 fs from the divide-by-8192 frequency divider 9 shown in FIG. 1, using the C1 and C2 parity data, and routes the error-corrected data to a delay memory 104L. If data has been unable to be corrected, an error flag is formed and routed to an error detector 106.

The error correction circuit 103R performs error correction on the right-route audio data from the demodulator 102R, based upon clocks of 1/8192 fs, using the C1 and C2 parity data, and routes the error-corrected data to a demultiplexer 105R. If data has been unable to be corrected, an error flag is formed and routed to an error detector 106.

As described above, the left-route audio data and the right-route audio data, recorded on the motion picture film 100, are recorded at recording positions shifted 17.8 frames relative to each other. Thus the left-route audio data are delayed in delay memory 104L by 17.8 frames for timing matching with respect to the right-route audio data. The timing-matched left-route data are routed to the demultiplexer 105L.

The demultiplexer 105L generates, from the left-route audio data serially transmitted from the delay memory 104, center-channel audio data Cn of the center channel C, left-channel audio data Ln of the left channel L, center left channel audio data CLn of the center left channel LC, audio data SLn of the left surround channel SL, audio data SWn of the sub-woofer channel SW and audio data RMn of right mix channel RM, and transmits the resulting audio data to decoders 107a to 107f.

The demultiplexer 105R generates, from the right-route audio data serially transmitted from the error correction circuit 103R, audio data Cn of the center channel C, audio data Rn of the right channel R, audio data RC of the center right channel RC, audio data SRn of the right surround channel SR, audio data SWn of the sub-woofer channel SW and audio data LMn of the left mix channel LM, and transmits the resulting audio data to decoders 107g to 107l.

The decoders 107a to 107d perform high-efficiency decoding on the left-route audio data Cn, Ln, CLn and SLn, based upon the clocks of 1/512 fs from the divider 9 shown in FIG. 1, and route the decoded data to the left-route data selectors 108a to 108d. The decoder 107e performs high-efficiency decoding on the left-route audio data SWn based upon the 1/512 fs clocks and transmits the decoded data to the right-channel data selector 109d. The decoder 107f performs high-efficiency decoding on the left-route audio data RMn, based upon the 1/512 fs clocks, and transmits the decoded data to the right-channel data selectors 109a to 109c.

The decoder 107g performs high-efficiency decoding on the right-route audio data C, based upon the 1/512 fs clocks, and transmits the resulting data to the date selector 108a. The decoders 107h to 107k perform high-efficiency decoding on the right-route audio data Rn, CRn, SRn and SWn, based upon the 1/512 fs clocks, and route the decoded data to the right-route data selectors 109a to 109d. The decoder 107l performs high-efficiency decoding on the right-route audio data LMn, based upon the 1/512 fs clocks, and transmits the decoded data to the right-channel data selectors 108b to 108d.

Each of the data selectors 108a to 108d and 109a to 109d is fed with a detection output from the error detection circuit 108. Thus it becomes possible for the data selectors 108a to 108d and 109a to 109d to detect data which has not been corrected for errors based upon the detection output. Each of the data selectors 108a to 108d and 109a to 109d is fed with two of the audio data and selects and outputs data other than data which has not been corrected for errors.

That is, the data selector 108a selects and outputs one of the audio data Cn of the right-route center-channel and the left-route center-channel C which has been corrected for errors. The data selector 108b selects and outputs one of the audio data Ln of the left channel L and the audio data LMn of the left mix channel LM which has been corrected for errors. The data selector 108c selects and outputs one of the audio data LCn of the left-center channel LC and the audio data LMn of the left-mix channel LM which has been corrected for errors. The data selector 108d selects and outputs one of the audio data SLn of the left-surround channel LC and the audio data LMn of the left-mix channel LM which has been corrected for errors.

The data selector 109a selects and outputs one of the audio data Rn of the right channel R and the audio data RMn of the right mix channel RM which has been corrected for errors. The data selector 109b selects and outputs one of the audio data RCn of the right center channel RC and the audio data RMn of the right mix channel RM which has been corrected for errors. The data selector 109c selects and outputs one of the audio data SRn of the right sub-woofer channel SR and the audio data RMn of the right mix channel RM which has been corrected for errors. The data selector 109d selects and outputs one of the audio data SWn of the respective sub-woofer channel SW which has been corrected for errors.

If both of the data fed to the data selectors 108a to 108d and 109a to 109d are effective, the data selectors select and output one of desired data. Conversely, if none of the data supplied to the data selectors is valid, none of the data is outputted by the data selectors, and analog audio signals supplied via an analog audio signal input terminal, not shown, are selected and outputted.

With the motion picture film 100, audio data RMn of the right mix channel RM, mixed from the right channel R, center right channel RC and the surround right channel SR is recorded on the digital sound track 85L for the left channel on which left-route audio data SLn, Ln and CLn are recorded, while audio data LMn of the left mix channel LMn, mixed from the left channel L, center left channel CL and surround left channel SL is recorded on the digital sound track 85R for the right channel on which right-route audio data SRn, Rn and CRn are recorded. In addition, the audio data of the respective channels, recorded on the digital sound track 85R, is recorded with a time difference with respect to audio data of the respective tracks recorded on the digital sound track 85L.

Consequently, should an extremely long burst error be produced on, for example, the digital sound track 85L, and an error is present on the other digital sound track 85R, the audio data LMn mixed from the audio data Ln, LCn and SLn, may be reproduced, so that left-route signals can be reproduced from these audio data.

Referring to FIG. 1, when playback of the first film roll set on the first film reader 1 approaches its end, and the time is appropriate for making a changeover for starting the reproduction of the second film roll, the changeover controller 6 controls the second film reader to a reproducing state. The same information (picture information and speech information) is recorded for a pre-set time duration at the trailing portion of the first film roll and at the start portion of the second film roll.

The second film reader 2 detects the clock FG2 of the repetition frequency (96 Hz) of the perforations from the reproduced motion picture film and routes the 96 Hz frame frequency signal FG2 to the non-inverting input terminal 26 of the phase comparator within the second clock generating circuit 4, while routing the track frequency signal ft2 of the repetition frequency (17.2 kHz) corresponding to the track pitch of the audio data to the divide-by-25 frequency divider 20.

The divide-by-25 frequency divider 20 divides the track frequency signal ft2 having the repetition frequency of 17.2 kHz by ⅟25 for routing the divided signal to the non-inverting input terminal of the phase comparator 21.

The second clocks 512fs2 outputted from the second VCO 24 as later explained are fed back to the inverting input terminal of the phase comparator 21 after frequency division by the frequency divider 25. The comparator 21 phase-compares the repetition frequency ft2 frequency-divided by the divide-by-20 frequency divider 20 to the second clock 512fs2 frequency-divided by the frequency divider 25, and transmits the difference to the second VCO 24 via an integration circuit made up of a resistor 22 and a capacitor 23. The loop made up of the phase comparator 21, resistor 22, capacitor 23, second VCO 24 and the frequency divider 25 has loop characteristics having a e.g., a 200-sec time constant τ2 A.

The second clock 512fs2 from the second VCO 24 is fed back to the inverting input terminal of the phase comparator 26 after frequency division by the frequency divider 29. The phase comparator 26 phase-compares the repetition frequency FG2 to the second clock 512fs2 frequency-divided by the frequency divider 29, and transmits the comparison output to the second VCO 24 via an integration circuit made up of a resistor 27 and a capacitor 28. The loop made up of the phase comparator 26, resistor 27, capacitor 28, second VCO 24 and the frequency divider 29 has loop characteristics having a e.g., a 1-sec time constant τ2 B.

The second VCO 24 is responsive to a comparison output of the comparator 21 and a comparison output of the comparator 26 and forms the second clock 512fs2 of the frequency of 512×44.1 kHz which is routed to a fixed terminal 31b of the second changeover switch 31 within the changeover switch 5.

The reproducing system of the audio data of the second film reader 2 has the same arrangement as that shown in FIG. 9, wherein audio data of respective channels reproduced as described above is fed to the fixed terminal 30b of the first changeover switch 30 within the changeover switch 5.

As described above, the first film reader 1 and the film reader 2 are run in parallel at the time of the changeover and the changeover switch 5 is changed over by the changeover controller 6 at a measured timing for selecting the fixed terminal 30b by the movable contact 30c and for selecting the fixed terminal 31b by the movable contact 31c.

Thus the audio data of the second film roll, reproduced by the second film reader 2 via the output terminal 32 by the changeover switch 31, is fed to the demodulator 102L, 102R shown in FIG. 9.

On the other hand, the second clock 512fs2, supplied via the second changeover switch 31 from the second clock forming circuit 4, is fed to the system clock generating circuit 7.

The system clock generating circuit 7 generates system clock 512fs3 based upon the second system clock 512fs2 from the second clock generating circuit 4.

It is noted that at the time of changeover in which the film winding start end of the second roll and the film winding terminal end of the first roll are overlapped with each other, the motion picture film, so far controlled to run under a constant tension, is disturbed in tension and film running becomes extremely unstable. Thus the second clock 512fs2 from the second clock generating circuit 4, supplied to the system clock generating circuit 7 after changeover via the changeover circuit 5, are fed as unstable clocks to the system clock generating circuit 7.

However, the system clock generating circuit 7 has longer time constants τM1, τM2 in contrast to the time constants of τ1 A, τ1 B, τ2 A, τ2 B the first and second clock generating circuits 3, 4.

Consequently, even if unstable second clock 512fs2 are supplied during the changeover operation from the second clock generating circuit, the phase locked loop of the system clock generating circuit 7 is smoothly operated by the pre-set time constant looping characteristics for locking the second clocks 512fs2.

Thus it becomes possible to generate stable correct system clocks to thereby realize accurate audio data playback and an ideal changeover operation.

On the other hand, since the system clock is generated by the third VCO 39 in the system clock generating circuit 7 responsive to a comparison output from the phase comparator 38 and to a control clock from the memory capacity measurement circuit 41, it becomes possible to generate the system clock responsive to the residual quantity of the buffer memory space for time axis correction of the audio data. The result is the formation of a correct and stable system clock to contribute to the accurate audio data reproduction and the ideal changeover operation.

On the other hand, since the first and second clock generating circuits 3, 4 generate first and second clocks based upon the repetition frequency of the perforations and upon the audio data track pitch repetition frequency, it becomes possible to generate correct first and second output clocks to thereby contribute to the reproduction of correct audio data.

In addition, since the first clock from the first clock generating circuit 3 is changed over to the second clock from the second clock generating circuit 4 and vice versa during the changeover operation, and the system clock generating circuit V generates the system clock 512fs3 from the first clock 512fs1 or the second clock 512fs2, while the audio data formed by the first film reader 1 are changed over to that formed by the second film reader 2 or vice versa, it is sufficient to provide only one unit of the audio data reproducing system downstream of the demodulator 102L, 102R as shown in FIG. 9, thus contributing to a simplified and inexpensive changeover system for the motion picture film.

The above description of the changeover system for the motion picture film according to the present invention has been provided with specified numerical figures, such as the repetition frequency of 96 Hz of the film perforations and the repetition frequency of 17.2 kHz of the audio data, upon which the first and second clocks are generated. However, this is merely illustrative and various modification may be made within the technical scope of the present invention.

For example, it is possible for the first and second clock generating circuits 3 and 4 to form the first and second clocks based only on the frame frequency signals FG1 and FG2 produced by detecting the perforations, or to generate the first and second clocks based only on the track frequency signals ft1 and ft2 corresponding to the track pitch of the audio data.

With the clock generator in the changeover system for the motion picture film according to the present invention, since the system clock generating means of the phase locked loop construction has loop characteristics of a longer time constant than the first or second clock generating means, the phase locked loop of the system clock generating means is operated smoothly for locking the first or second clocks though the film running during the changeover operation becomes markedly unstable such that unstable first or second clocks are supplied via the changeover means.

Consequently, stable correct system clocks may be generated during the changeover operation to achieve correct audio data reproduction and ideal changeover operation.

With the clock generator in the changeover system for the motion picture film according to the present invention, it becomes possible to generate correct and stable system clocks, since the control means controls the oscillating means provided in the system clock generating means depending on the difference between the frequencies of the respective clocks from the changeover means and the frequency of the system clock of the system clock generating means.

In addition, correct audio data reproduction and ideal changeover operation may be achieved since the clock generator in the changeover system for the motion picture film according to the present invention generates first and second clocks based upon the frame frequency signals and the track frequency signals corresponding to the track pitch of the audio data.

What is claimed is:

1. A clock generator in a changeover system for a motion picture film in which audio data is reproduced by changeover between a first film reader for reading out audio data from a digital sound track of a first motion picture film at a first frame frequency and a second film reader for reading out audio data from a digital sound track of a second motion picture film at a second frame frequency substantially equal to said first frame frequency, the audio data being recorded on the digital sound track of each motion picture film at a track pitch, comprising first clock forming means including a phase locked loop for forming a first clock signal of a frequency equal to a pre-set number times the first frame frequency based upon a frequency signal whose frequency is changed as a function of a film running speed of the first motion picture film, the first clock forming means exhibiting a time constant;

second clock forming means including a phase locked loop for forming a second clock signal of a frequency equal to the pre-set number times the second frame frequency based upon a frequency signal whose frequency is changed as a function of a film running speed of the second motion picture film, the second clock forming means exhibiting a time constant; changeover means for commuting between the first clock signal from the first clock forming means and the second clock signal from the second clock forming means and outputting the commuted clock signal, and system clock forming means including a phase locked loop for forming a system clock signal of a frequency equal to a predetermined number times a sampling clock frequency of the audio data recorded on said digital sound track of said first or second motion picture film based upon the commuted clock signal from said changeover means, said system clock forming means having looping characteristics of a pre-set time constant longer than the time constant of said first or second clock forming means.

2. The clock generator as claimed in claim 1 wherein said system clock forming means includes oscillation means, and control means for controlling said oscillation means in response to a difference between the frequency of the commuted clock signal from said changeover means and the frequency of the system clock signal.

3. The clock generator as claimed in claim 1 wherein each of said first and second clock forming means forms the respective first or second clock signal based upon a frame frequency signal detected by said first or second film reader, respectively.

4. The clock generator as claimed in claim 1 wherein each of said first and second clock forming means forms the respective first or second clock signal based upon a track frequency signal corresponding to the track pitch of the audio data detected from at least one of said two digital sound tracks.

5. The clock generator as claimed in claim 1 wherein each of said first and second clock forming means forms the respective first or second clock signal based upon a frame frequency signal and a track frequency signal corresponding to the track pitch of the audio date supplied from the film readers.

6. An audio data readout device for a motion picture film comprising a first film reader for reading out audio data from a digital sound track of a first motion picture film at a first frequency, a second film reader for reading out audio data from a digital sound track of a second motion picture film at a second frame frequency substantially equal to said first frame frequency, the audio data being recorded on the digital sound track of each motion picture film at a track pitch;

first clock forming means including a phase locked loop for forming a first clock signal of a frequency equal to a pre-set number times the first frame frequency based upon a frequency signal whose frequency is changed as a function of a film running speed of the first motion picture film, the first clock forming means exhibiting a time constant;

second clock forming means including a phase locked loop for forming a second clock signal of a frequency equal to the pre-set number times the second frame frequency based upon a frequency signal whose frequency is changed as a function of a film running speed of the second motion picture film, the second clock forming means exhibiting a time constant;

changeover means for commuting between audio data read out by said first film reader and audio data read out by said second film reader and also for commuting between the first clock signal from the first clock forming means and the second clock signal from the second clock forming means to output a commuted clock signal, and system clock forming means including a phase locked loop for forming a system clock signal of a frequency equal to a predetermined number times a sampling clock frequency of the audio data recorded on said digital sound track of said first or second motion picture film based upon the commuted clock signal from said changeover means, said system clock forming means having looping characteristics of a pre-set time constant longer than the time constant of said first or second clock forming means.

7. The audio data readout device as claimed in claim 6 wherein said system clock forming means concludes oscillation means, and control means for controlling said oscillation means in response to a difference between the frequency of the commuted clock signal from said changeover means and the frequency of the system clock signal.

8. The audio data readout device as claimed in claim 6 wherein each of said first and second clock forming means forms the respective first or second clock signal based upon a frame frequency signal detected by said first or second film reader, respectively.

9. The audio data readout device as claimed in claim 6 wherein each of said first and second clock forming means forms the respective first or second clock signal based upon a track frequency signal corresponding to the track pitch of the audio data detected from at least one of said two digital sound tracks.

10. The audio data readout device as claimed in claim 6 wherein each of said first and second clock forming means forms the respective first or second clock signal based upon a frame frequency signal and a track frequency signal corresponding to the track pitch of the audio data supplied from the film readers.

* * * * *